(12) United States Patent
Heo et al.

(10) Patent No.: US 8,227,125 B2
(45) Date of Patent: Jul. 24, 2012

(54) FUEL CELL SYSTEM AND FUEL SUPPLY METHOD THEREOF

(75) Inventors: Jin S. Heo, Suwon-si (KR); Takami Higashi, Suwon-si (KR); Jae Hyuk Oh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 509 days.

(21) Appl. No.: 12/379,370

(22) Filed: Feb. 19, 2009

(65) Prior Publication Data

US 2010/0062291 A1    Mar. 11, 2010

(30) Foreign Application Priority Data

Sep. 9, 2008  (KR) .................. 10-2008-0088952

(51) Int. Cl.
*H01M 8/04* (2006.01)
(52) U.S. Cl. ...................................................... 429/437
(58) Field of Classification Search .................. 429/429, 429/437, 422, 425, 441, 436, 412, 415, 416
See application file for complete search history.

(56) References Cited

U.S. PATENT DOCUMENTS

| | | | |
|---|---|---|---|
| 6,908,700 B2 * | 6/2005 | Iio ................................ | 429/422 |
| 7,101,531 B2 * | 9/2006 | Kamijo ......................... | 423/650 |
| 7,425,880 B2 * | 9/2008 | Chen ............................ | 333/185 |
| 2006/0046114 A1 | 3/2006 | Kato et al. | |

FOREIGN PATENT DOCUMENTS

| | | |
|---|---|---|
| JP | 7-235321 | 9/1995 |
| JP | 07-235321 | 9/1995 |
| JP | 2008-243691 | 10/2008 |
| KR | 10-2007-0102311 | 10/2007 |
| WO | 2005/105506 A1 | 11/2005 |

OTHER PUBLICATIONS

European Search Report dated Dec. 30, 2009 and issued in corresponding European Patent Application 09156896.4.

* cited by examiner

*Primary Examiner* — Phuong Dinh
(74) *Attorney, Agent, or Firm* — Staas & Halsey LLP

(57) ABSTRACT

A stable fuel supply system in a fuel cell system produces heat and electricity by combining hydrogen modified from a major raw material selected from various hydrogen compounds, with oxygen existing in air. A fuel supply device and a fuel supply method in a fuel cell system, which automate a steam to carbon ratio (S/C) control and a lamda control, and achieve a fuel cell system operation efficiently and stably coping with pressure loss and pulsation occurring within the system, while using a minimum number of balance-of-plant (BOP) units. A method more efficiently and precisely supplies fuel during the start-up and operation of the fuel cell system, while preventing flame failure of a burner and maintaining an appropriate carbon monoxide concentration even when an abrupt flow rate variation occurs. Also, an operating method improves functions associated with a decomposition ability based on selection of the specification of a fuel pump, and thus, is more economical and stable in terms of the costs and configuration of the fuel cell system.

26 Claims, 10 Drawing Sheets

FUEL CELL SYSTEM AND FUEL SUPPLY METHOD THEREOF

CROSS-REFERENCE TO RELATED APPLICATIONS

This application claims the benefit of Korean Patent Application No. 10-2008-88952, filed on Sep. 9, 2008 in the Korean Intellectual Property Office, the disclosures of which are incorporated herein by reference.

BACKGROUND

1. Field

The present invention relates to a fuel cell system and a fuel supply method thereof, and, more particularly, to a fuel cell system and a fuel supply method thereof, which are capable of reducing pulsation of fuel supplied to a reformer and a burner, thereby stably supplying the fuel, and maintaining a desired ratio of the components of modifying gas supplied to a stack.

2. Description of the Related Art

Generally, a fuel cell is an electricity generating device to directly convert chemical energy of hydrogen and oxygen contained in hydrocarbon-based fuel such as methanol, ethanol, or natural gas into electrical energy in accordance with an electrochemical reaction. FIG. 1 is a schematic view to explain the electricity generating principle of such a fuel cell. When air containing oxygen is supplied to a cathode 1, and fuel containing hydrogen is supplied to an anode 3, a reaction reverse to electrolysis of water occurs through an electrolyte membrane 2, so that electricity is generated. Typically, the electricity generated from such a unit cell 4, has a voltage too low to enable the electricity to be useful. To this end, several unit cells 4 are connected in series in the form of a stack.

To produce hydrogen to be supplied to such a fuel cell stack (hereinafter, simply referred to as a "stack"), a fuel treating unit is used. The fuel treating unit includes a reformer to modify fuel (for example, city gas for domestic use), and thus, to produce high-quality hydrogen, and a burner to heat the reformer such that the reaction temperature of the reformer is maintained at an appropriate temperature. Fuel to be modified for production of high-quality hydrogen (hereinafter, referred to as "reformer fuel") is supplied to the reformer, together with water (deionized water (DI-water)). Fuel to be burnt for adjustment of the reformer temperature (hereinafter, referred to as "burner fuel") is supplied to the burner, together with air containing oxygen. Such reformer fuel and burner fuel have considerable influence on the production of high-quality hydrogen. That is, the operation performance of the fuel cell system is considerably influenced by a steam to carbon ratio (S/C) control to control the ratio of the reformer fuel to water, at which the reformer fuel and water are supplied to the reformer, and thus, to control the carbon monoxide concentration determining the performance of the stack, and a lamda (the ratio of burner fuel to air) control to control the ratio of the burner fuel to air, at which the burner fuel and air are supplied to the burner, and thus, to enable the reformer fuel to efficiently react in the reformer while maintaining a flame at the burner.

In the case of a domestic fuel cell system, fuel, namely, city gas, is supplied at a pressure of about 2 to 3 Kpa. For this reason, the domestic fuel cell system uses a fuel pump or the like, taking into consideration a pressure loss occurring in the system and pulsation occurring during the reaction between the fuel treating unit and the stack. The fuel pump is used together with a blower, a valve, etc., in order to achieve the supply of fuel to the interior of the fuel cell system and other operations. These devices are referred to as "balance-of-plant (BOP)" units. The specification of each BOP unit is determined, taking into consideration the internal system pressure loss and pulsation. However, such pressure loss and pulsation phenomena are continuously varied, are not in a static state, but rather are in a dynamic state. For this reason, in the case of a particular BOP unit, for example, the fuel pump, it is impossible to determine the stable and efficient specification of the fuel pump. The operation of the fuel pump may be influenced by the internal/external system pressure loss (pressurization) and pulsation. In particular, in the domestic fuel cell system, considerable pulsation may occur due to a variation in fuel flow rate because the fuel supply pressure may be lowered to at least 1 Kpa. In this case, a flame may fail. Also, the concentration of carbon monoxide may be unstable. As a result, an imperfect operation condition may occur. Furthermore, when it is necessary to rapidly start up the fuel cell system, a burner fuel pump may be additionally used to increase the flow rate of the burner fuel. However, this is non-economical in terms of costs. Under such circumstances, it is important to provide an economical and stable fuel supply system for the fuel cell system.

SUMMARY

The present invention has been made in view of the above-mentioned problems, and an aspect of the present invention is to provide a fuel supply device and a fuel supply method in a fuel cell system, which are capable of automating an S/C control and a lamda control, and achieving a fuel cell system operation efficiently and stably coping with pressure loss and pulsation occurring within the system, while using a minimum number of balance-of-plant (BOP) units for the supply of reformer fuel and burner fuel.

Additional aspects and/or advantages of the invention will be set forth in part in the description which follows and, in part, will be apparent from the description, or may be learned by practice of the invention.

In accordance with an aspect, a fuel cell system includes: a fuel treating unit to modify fuel and produce modified gas; a stack to receive the modified gas from the fuel treating unit, to generate energy; a fuel supplying unit to supply the fuel to the fuel treating unit; and a controller to determine a fuel supply amount required for a real-time operation of the fuel treating unit, and to control the fuel supplying unit to supply the determined fuel supply amount.

The fuel treating unit may include a reformer to modify the fuel, and a burner to heat the reformer. The fuel supplying unit may include a first fuel supplier to control a total supply amount of the fuel supplied to the fuel treating unit, and a second fuel supplier to control fuel supply amounts respectively supplied to the reformer and the burner.

The first fuel supplier may include a fuel pump to supply the fuel to the fuel treating unit, and may be controlled such that the fuel pump supplies a fuel amount equal to a sum of the fuel supply amount supplied to the reformer as a supply amount of reformer fuel and the fuel supply amount supplied to the burner as a supply amount of burner fuel.

The first fuel supplier may control the total supply amount of the fuel so that the fuel pump supplies the fuel in an amount more than the sum of the reformer and burner fuel supply amounts, to cause the fuel to be pressurized.

The second fuel supplier may include a first valve to supply the reformer fuel to the reformer, and may be controlled such that the first valve controls a flow of reformer fuel to supply the reformer fuel supply amount required for the reformer.

The second fuel supplier may include a second valve to supply the burner fuel to the burner, and may be controlled such that the second valve controls a flow of burner fuel to supply the burner fuel supply amount required for the burner.

In accordance with another aspect, a fuel cell system includes: a fuel treating unit to modify fuel to produce hydrogen; a stack to generate energy through an electrochemical reaction of the hydrogen with oxygen; a fuel supplying unit to supply the fuel to the fuel treating unit; and a main controller to control the fuel supplying unit such that the fuel supplying unit supplies an amount of reformer fuel required in real time for a reformer to perform the modification, and a supply amount of burner fuel required in real time for a burner to heat the reformer.

The fuel supplying unit may include a first fuel supplier to control a total supply amount of the fuel supplied to the reformer and the burner, and a second fuel supplier to control supply amounts of the fuel respectively supplied to the reformer and the burner.

The first fuel supplier may include a fuel pump to increase a supply pressure of the fuel such that the fuel is supplied in an amount equal to a sum of the supply amount of the fuel respectively supplied to the reformer and the burner as reformer fuel and burner fuel.

The fuel pump supplies the fuel in an amount that is more than the sum of the reformer and burner fuel supply amounts, in a pressurized state, to reduce pulsation of the fuel supplied to the reformer and the burner.

The first fuel supplier may further include a first flow meter to detect an actual fuel supply amount of the fuel pump.

The first flow meter may send, to the main controller and a first controller, a fuel supply amount varying in real time in accordance with a supply-side pressure of a fuel supply source to supply the fuel and a pressure variation occurring in the system.

The first fuel supplier may further include the first controller to compare the actual fuel supply amount received from the first flow meter with the sum of the set point of the reformer fuel supply amount and the set point of the burner fuel supply amount, and to determine an operation of the fuel pump in accordance with a result of the comparison. Here, the "set points" may mean target fuel supply amounts determined by the main controller and first controller, respectively.

The second fuel supplier may include a reformer fuel supply line to control the supply amount of the reformer fuel supplied to the reformer, and a burner fuel supply line to control the supply amount of the burner fuel supplied to the burner.

The reformer fuel supply line may include a first valve to adjust a supply ratio of the reformer fuel supplied to the reformer. A steam to carbon ratio (S/C) control may be executed in accordance with the control of the first valve.

The first valve may be a proportional valve connected to the fuel pump, to precisely control a flow rate of the reformer fuel.

The burner fuel supply line may include a second valve to adjust a supply ratio of the burner fuel supplied to the burner.

The second valve may be a proportional valve connected to the fuel pump, to precisely control a flow rate of the burner fuel.

The burner fuel supply line may include a second flow meter to detect a flow rate of fuel passing through the second valve.

The fuel cell system may further include a main controller to determine the reformer fuel supply amount and the burner fuel supply amount, and to send values obtained in accordance with the determination to the fuel supplying unit.

The main controller may determine the fuel supply amount of the fuel pump in accordance with a set point of the reformer fuel supply amount and a set point of the burner fuel supply amount, may compare the determined fuel supply amount of the fuel pump with an actual fuel supply amount of the fuel pump detected by the first flow meter, and may adjust a power of the fuel pump in accordance with a result of the comparison.

The main controller may execute a comparison between the set point of the reformer fuel supply amount and an actual reformer fuel supply amount and a comparison between the set point of the burner fuel supply amount and an actual burner fuel supply amount, to control the opening degrees of the first and second valves, respectively.

The main controller may execute a proportional-integral (PI) control for the first and second valves, to adjust the reformer fuel supply amount and the burner fuel supply amount.

The main controller may calculate the difference between the actual fuel supply amount detected by the first flow meter and the actual fuel supply amount detected by the second flow meter, and may compare the calculated difference with the set point of the reformer fuel supply amount, to control the opening degree of the first valve.

In accordance with another aspect, a supply method of a fuel cell system to generate energy through an electrochemical reaction of hydrogen produced through modification of fuel with oxygen, includes: determining a supply amount of reformer fuel supplied to a reformer to perform the modification; determining a supply amount of burner fuel supplied to a burner to heat the reformer; determining a fuel supply amount of a fuel pump in accordance with the determined reformer fuel supply amount and the determined burner fuel supply amount, and controlling an operation of the fuel pump in accordance with the determined fuel supply amount of the fuel pump; and controlling a flow rate of fuel supplied to the reformer and a flow rate of fuel supplied to the burner such that the flow rates supply, in real time, the determined reformer and burner fuel supply amounts.

The controlling the operation of the fuel pump may include operating the fuel pump such that the fuel supply amount of the fuel pump is equal to a sum of the reformer fuel supply amount and the burner fuel supply amount.

The controlling the operation of the fuel pump may include operating the fuel pump such that the fuel pump supplies the fuel in an amount that is more than a sum of the reformer fuel supply amount and the burner fuel supply amount, in a pressurized state, to adjust a total supply amount of the fuel supplied to the reformer and the burner.

The controlling the operation of the fuel pump may include stopping the fuel pump when a fuel amount equal to a sum of the reformer fuel supply amount and the burner fuel supply amount can be supplied by an external supply pressure of the fuel.

The controlling, in real time, the flow rate of fuel supplied to the reformer and the flow rate of fuel supplied to the burner may include providing a second valve and a flow meter in a burner fuel supply line, and controlling the flow rate of fuel supplied to the burner to supply the determined burner fuel supply amount in accordance with an adjustment of an opening degree of the second valve and a flow rate detection of the second flow meter, and providing a first valve in a reformer fuel supply line, and controlling the flow rate of fuel supplied to the reformer to supply the determined reformer fuel supply amount in accordance with an adjustment of an opening degree of the first valve and a detection of a difference between a fuel supply amount detected by the second flow meter and an actual fuel supply amount of the fuel pump.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Figure 1:
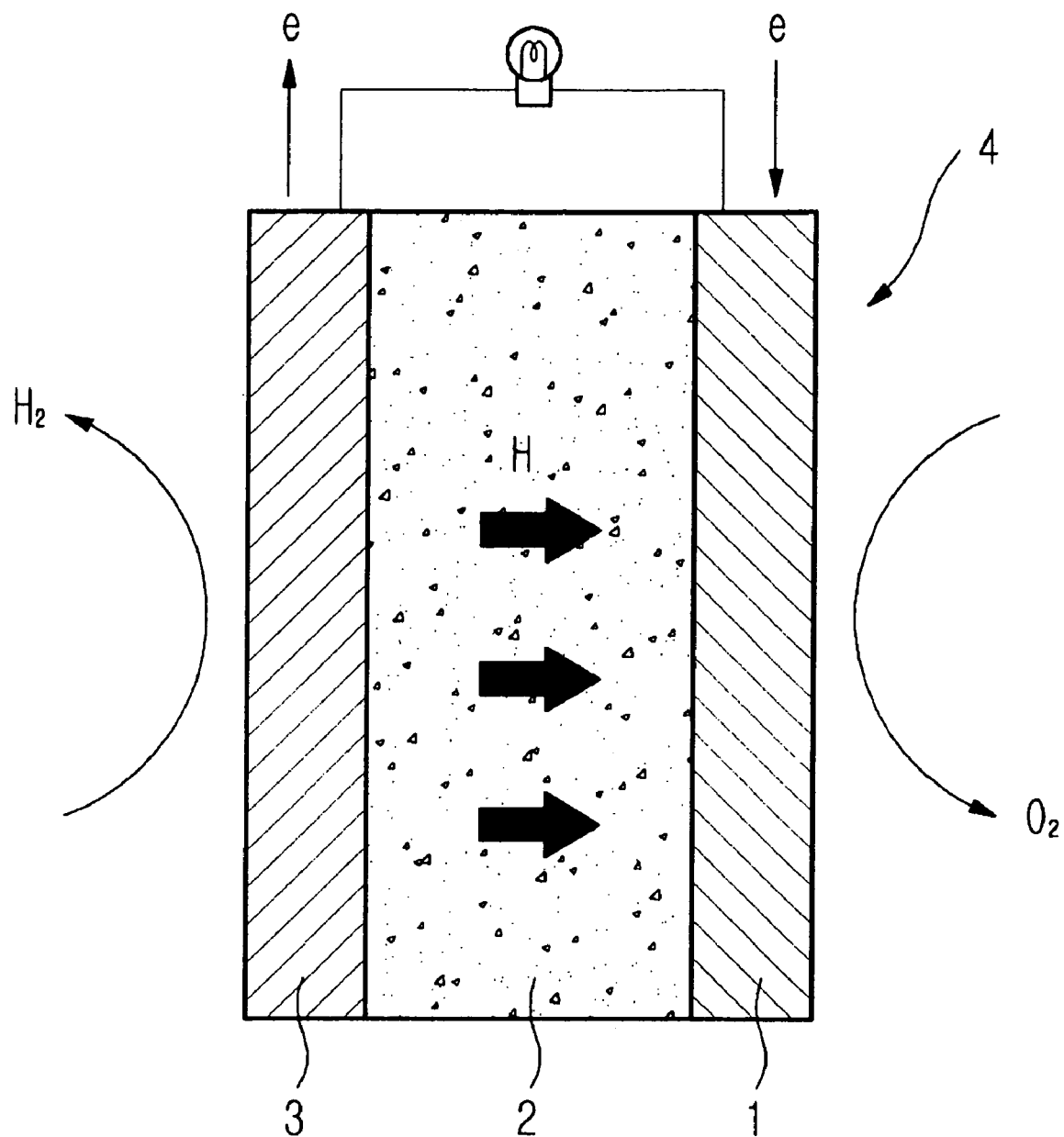
FIG. 1 is a schematic view to illustrate an electricity generating principle of a general fuel cell.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
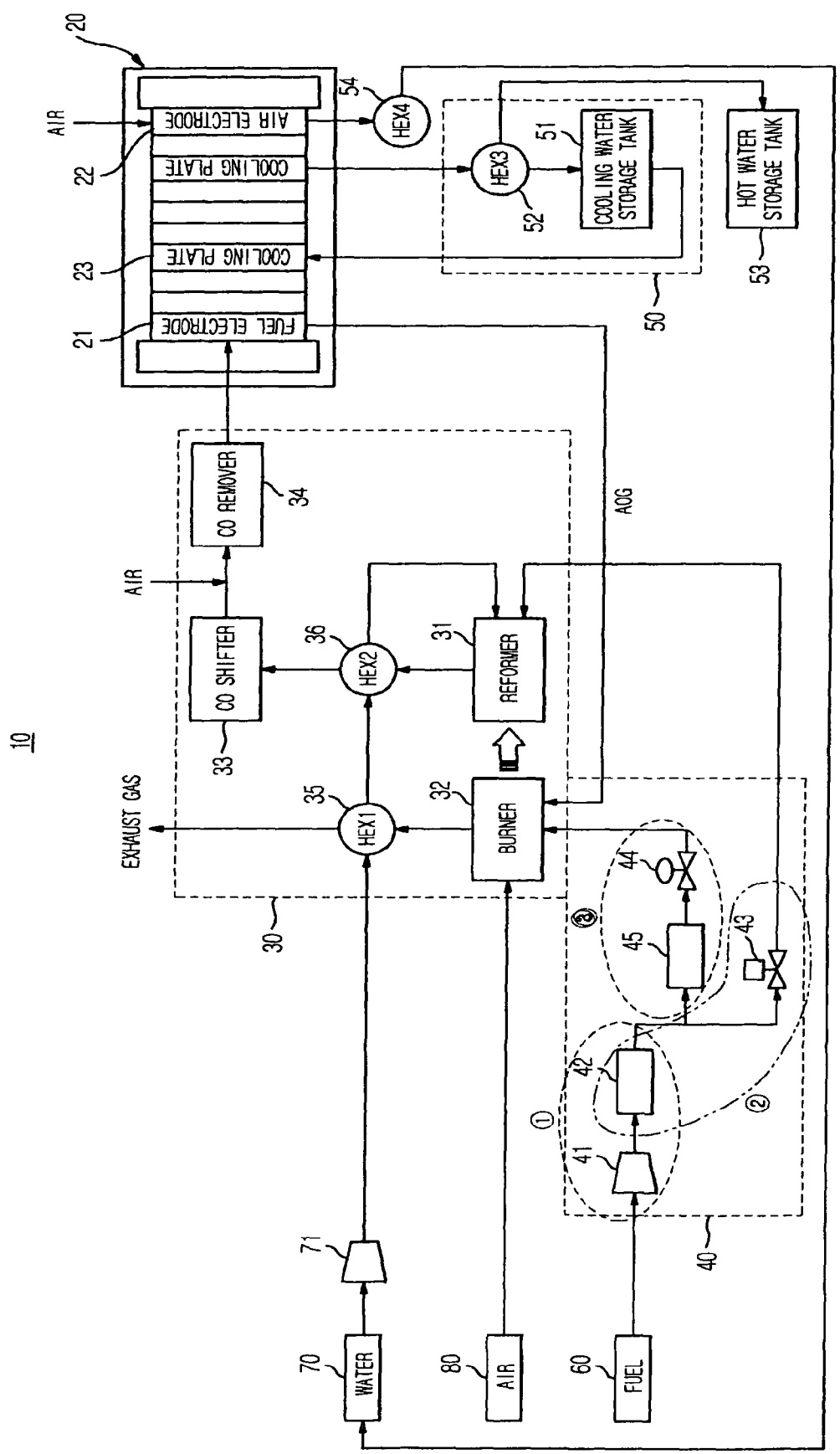
FIG. 2 is a block diagram illustrating a fuel cell system according to an embodiment of the present invention.

FIG. 2 is a block diagram illustrating a fuel cell system according to an embodiment of the present invention.

Referring to FIG. 2, the fuel cell system 10 according to the illustrated embodiment of the present invention includes a stack 20 to generate electricity, a fuel treating unit 30 to produce hydrogen to be supplied to the stack 20, a fuel supplying unit 40 to supply fuel 60 to the fuel treating unit 30, a cooling unit 50 to cool the stack 20, and balance-of-plant (BOP) units.

The stack 20 is an electricity generating device to directly convert chemical energy of hydrogen and oxygen contained in the fuel 60, namely, hydrocarbon-based fuel such as methanol, ethanol, or natural gas into electrical energy in accordance with an electrochemical reaction. The stack 20 has a laminated structure of several unit cells or several ten unit cells each including a membrane electrode assembly (MEA) and a separator. The stack 20 constitutes a fuel cell body. In FIG. 2, fuel electrodes 21, air electrodes 22, and cooling plates 24 are conceptually shown as being included in the stack 20 according to the illustrated embodiment of the present invention. Practically, the stack 20 has a structure wherein one cooling plate 23 is installed for every laminated structure of several unit cells, each including an MEA in which one fuel electrode 21 and one air electrode 22 are respectively arranged at opposite sides of one electrolyte membrane.

In an electrochemical reaction, not only electricity, but also heat is generated. For this reason, it is necessary to continuously dissipate the generated heat to achieve a smooth operation of the stack 20. To this end, one cooling plate is installed in the stack 20 for every 5 to 6 unit cells to provide a channel through which heat-exchanging cooling water passes.

At each fuel electrode 21, hydrogen is separated into hydrogen ions and electrons by a catalyst, so that electricity is generated. The hydrogen ions and electrons generated from the fuel electrode 21 are combined with oxygen at the corresponding air electrode 22, thereby producing water. Each cooling plate 23, which is arranged between adjacent unit cell groups each including several unit cells, provides a flow passage, through which cooling water for heat exchange flows, to dissipate heat generated together with electricity during the electrochemical reaction, and thus, to appropriately control the temperature of the stack 20.

The fuel treating unit 30 is a modifier which produces hydrogen by modifying and purifying fuel, and supplies the hydrogen to the stack 20. The fuel treating unit 30 includes a reformer 31 to modify the hydrocarbon-based fuel 60, namely, modifier fuel, and thus, to produce high-quality hydrogen (modified gas), and a burner 32 to heat the reformer 31, and thus, to maintain the reaction temperature of the reformer 31 at an appropriate temperature. The fuel treating unit 30 also includes a carbon monoxide shifter 33 and a carbon monoxide remover 34 to reduce the amount of carbon monoxide produced as a byproduct during the production of hydrogen in the reformer 31, and first and second heat exchangers 35 and 36 to heat water 70 supplied to the reformer 31.

The reformer 31 is a section which is heated by the burner 32, to generate a substantial modification reaction. The reformer 31 modifies the hydrocarbon-based fuel 60, namely, reformer fuel, using a catalyst. For this function, the reformer fuel (for example, city gas for domestic use) for production of high-quality hydrogen (modified gas) is supplied to the reformer 31, together with water 70 (DI-water). The steam to carbon ratio (S/C) control to control the ratio of the reformer fuel to water, at which the reformer fuel and water are supplied to the reformer 31, is important for the control of the concentration of carbon monoxide fatally adversely affecting the stack 20. That is, the production of high-quality hydrogen is considerably influenced by the S/C control.

Hydrocarbon contains a sulfur compound. The catalyst may be easily poisoned by the sulfur compound. For this reason, it is necessary to remove the sulfur compound from the hydrocarbon-based fuel 60 before the hydrocarbon-based fuel 60 is supplied to the reformer 31. To this end, a desulfurizer is arranged at an inlet of the reformer 31, to cause the hydrocarbon-based fuel 60 to be subjected to a modification process.

The burner 32 generates heat while burning the hydrocarbon-based fuel 60, namely, burner fuel, such as methanol, ethanol, or natural gas. The heat generated from the burner 32 is transferred to the reformer 31 to promote a modification reaction while maintaining the reaction temperature of the reformer 31 at an appropriate temperature. For this function, the burner fuel for the control of the temperature of the reformer 31 is supplied to the burner 32, together with air 80 containing oxygen. The lamda (the ratio of burner fuel to air)

control to control the ratio of the burner fuel to air, at which the burner fuel and air are supplied to the burner, enables the reformer fuel to efficiently react in the reformer while maintaining a flame at the burner 32. That is, the production of high-quality hydrogen is considerably influenced by the lamda control.

The carbon monoxide shifter 33 is a section to reduce, to 5,000 ppm (parts per million) or less, the amount of carbon monoxide produced as a by-product during the production of hydrogen in the reformer 31. In the carbon monoxide shifter 33, the following reaction occurs.

$$CO+H_2O \leftrightarrows CO_2+H_2$$

Since carbon monoxide acts as a catalyst poison on the catalyst used for the fuel electrodes 21 of the stack 20, the modified fuel 60 should not be directly supplied to the stack 20. The modified fuel 60 may be subjected to a shift process for removal of carbon monoxide so that the amount of carbon monoxide produced from the modified fuel 60 may be reduced to 5,000 ppm or less.

The modification section of the fuel treating unit 30, which may require high-temperature heat of 700° C. or more, namely, the reformer 31, receives the required heat from the burner 32 using a hydrocarbon-based material as the fuel thereof. The monoxide shifter 33, to which hydrogen-containing gas emerging from the reformer 31 is supplied, removes carbon monoxide contained in hydrogen produced in the reformer 31, and additionally produces hydrogen. Thus, high-quality hydrogen is supplied to the stack 20 which, in turn, generates electricity and heat.

The carbon monoxide remover 34 is a section of the fuel treating unit 30 to reduce the amount of carbon monoxide to within an allowable range through a preferential oxidation (PROX). In the carbon monoxide remover 34, the following reaction is carried out.

$$CO+0.5O_2 \leftrightarrows CO_2$$

Through a forward reaction in the carbon monoxide remover 34, the amount of carbon monoxide is reduced because carbon monoxide is transformed into carbon dioxide. As the hydrogen produced from the reformer 31 passes through the carbon monoxide remover 34, the content of carbon monoxide in the hydrogen is reduced to 10 ppm or less. The carbon monoxide remover 34 may be unnecessary where the stack 20 is of a high temperature type having a tolerance to carbon monoxide. However, where the stack 20 is of a low temperature type, the carbon monoxide remover 34 may be required. High-quality hydrogen discharged from the carbon monoxide remover 34 is supplied to the stack 20.

The first and second heat exchangers 35 and 36 heat the water 70 supplied to the fuel treating unit 30 through a water supply pump 71, to supply the water 70 in a steam state to the reformer 31. The water steam reacts with carbon monoxide in the reformer 31 heated by the burner 32, thereby producing hydrogen.

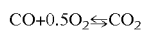

The fuel supplying unit 40 functions to supply the hydrocarbon-based fuel 60 to the fuel treating unit 30. The fuel supplying unit 40 includes a fuel pump 41 to pressurize the fuel 60 supplied from a fuel supply source, a first flow meter 42 to detect the actual fuel supply amount of the fuel pump 41, and a first valve 43 to control the supply ratio of the fuel 60 supplied to the reformer 31, namely, the supply ratio of the reformer fuel. The fuel supplying unit 40 also includes a second valve 44 to control the supply ratio of the fuel 60 supplied to the burner 32, namely, the supply ratio of the burner fuel, and a second flow meter 45 to detect the actual supply amount of the burner fuel.

The fuel pump 41 is used to supply the total amount of fuel 60 required in the reformer 31 and burner 32 in accordance with a set point of the supply amount of reformer fuel determined in a main controller 92 (FIG. 3) for the S/C control and a set point of the supply amount of burner fuel determined in the main controller 92 for the lamda control. The main controller 92 will be described later. The RPM of the fuel pump 41 is automatically controlled in accordance with the environment of the fuel supply source (for example, the fuel supply pressure of the fuel supply source). That is, once the set point of the reformer fuel supply amount and the set point of the burner fuel supply amount are determined, the total of the set reformer fuel supply amount and the burner fuel supply amount is supplied in accordance with operation of the fuel pump 41. During this operation, the flow rate of the fuel 60 is automatically controlled in accordance with the supply pressure of the fuel 60, to prevent the fuel 60 from being unnecessarily pressurized with a positive pressure or a negative pressure. When the fuel 60 is supplied in a sufficient amount at the supply pressure of the fuel 60 itself, without a pressurization by the fuel pump 41, it may be possible to reduce the amount of energy consumed by the fuel supplying unit 40 by reducing the power of the fuel pump 41 or stopping the fuel pump 41. In this case, it may also be possible to secure the durability of the fuel pump 41. The operation of the fuel pump 41 may be controlled in accordance with a feed forward control through the main controller 92 using a hardware configuration of the fuel supplying unit 40 integrated with the fuel pump 41 (FIG. 4), namely, a first controller 46 (printed circuit board (PCB)), together with the first flow meter 42, and a feedback control through the first controller 46 to reduce the power of the fuel pump 41 in accordance with the supply pressure of the fuel 60, and thus, to reduce the consumption of power. Control logics for the feed forward control and feedback control are disclosed in a book by Phillips Harbor entitled "Feedback Control Systems".

The first valve 43 is a proportional control valve (hereinafter, referred to as a "proportional valve") connected to an outlet of the fuel pump 41 to constitute a supply line for the reformer fuel, together with the first flow meter 42. The set point of the supply amount of the reformer fuel, namely, the supply amount of the fuel 60 required for a stable operation of the fuel cell system through the S/C control for the stabilization of the carbon monoxide concentration, is determined by the main controller 92. Practically, the supply amount of the reformer fuel is varied in real time due to various factors such as a variation in the internal pressure of the system itself and variations in the pressures of the supplied fuel and DI-water. The first valve 43 receives, from the main controller 92, a set point representing the supply amount of the reformer fuel varying in real time so that it may operate to supply, in real time, a required supply amount of the reformer fuel, and thus, to supply the required amount of the reformer fuel to the reformer 31. To enable the reformer 31 to generate a modification reaction, using the fuel 60 and water 70, the fuel treating unit 30 is heated to a high temperature (about 500 to 700° C.). In this case, the supply of the fuel 60 and water 70 to the reformer 31 may cause a variation in the internal pressure of the fuel treating unit 30. Consequently, the S/C and fuel supply amount may be influenced by the internal pressure variation. For a stable S/C control, accordingly, stable supply of the fuel 60 to the reformer 31 is achieved using the first valve 43 and first flow meter 42 arranged in the supply line for the reformer fuel, together with the second flow meter 45.

The second valve 44 is a proportional valve connected to an outlet of the fuel pump 41 to constitute a supply line for the burner fuel, together with the second flow meter 45. The set point of the supply amount of the burner fuel, namely, the supply amount of the fuel 60 required for a stable operation of the fuel cell system through the lamda control is determined by the main controller 92. Practically, the supply amount of the burner fuel is varied in real time due to various factors such as a variation in the internal pressure of the system itself and variations in the pressures of the supplied fuel and air. The second valve 44 receives, from the main controller 92, a set point representing the supply amount of the burner fuel varying in real time so that it may operate to control, in real time, a required supply amount of the burner fuel, and thus, to supply the required amount of the burner fuel to the burner 32. To enable the reformer 31 to generate a modification reaction, the fuel treating unit 30 is heated to a high temperature (about 500 to 700° C.). To heat the fuel treating unit 30, the fuel 60 and air 80 are supplied to the burner 32. When appropriate amounts of fuel 60 and air 80 are supplied to the burner 32, it may be possible to prevent soot from being formed in the fuel treating unit 30, and to achieve an enhancement in the durability of the fuel treating unit 30. Satisfactory conditions of exhaust gas may be obtained only when the supply of the burner fuel is stable. In particular, it may be possible to avoid a failure of ignition of the burner 32 due to the supply of the burner fuel, and to avoid a failure of flame upon a variation in the supply amount of the burner fuel made to control the power of the burner 32. To enable a temperature control for the reformer 31 through a control for the supply of the burner fuel, a set point control logic to control the temperature of the reformer 31 and a set point control logic to control the flow rate of the burner fuel may be connected to function as main/sub control logics.

Such a design of the fuel supplying unit 40 simplifies the BOP units, and thus, greatly contributes to providing economical effects. In particular, the internal feedback control of the fuel supplying unit 40 may reduce the mechanical influence on the fuel supplying unit 40.

The cooling unit 50 dissipates heat generated, together with electricity, during the electrochemical reaction process of the stack 20, to cool the stack 20. For this function, the cooling unit 50 includes a cooling water storage tank 51 and a third heat exchanger 52. Heat-exchange cooling water stored in the cooling water storage tank 51 absorbs heat from the stack 20 while passing through flow passages defined in the cooling plates 23 of the stack 20. The heat-absorbed cooling water is cooled by secondary cooling water in the third heat exchanger 52, and then again circulated to the cooling plates 23 of the stack 20.

Reference numeral "53" designates a hot water storage tank which stores the secondary cooling water heat-exchanged with the cooling water circulating the stack 20 to allow the stored secondary cooling water to be used as hot water for domestic use or the like. Reference numeral "54" designates a fourth heat exchanger to heat water emerging from the air electrodes of the stack 20, and to recover the heated water to the water supply pump 71. Reference numeral "81" designates an air supply pump.

Figure 3:
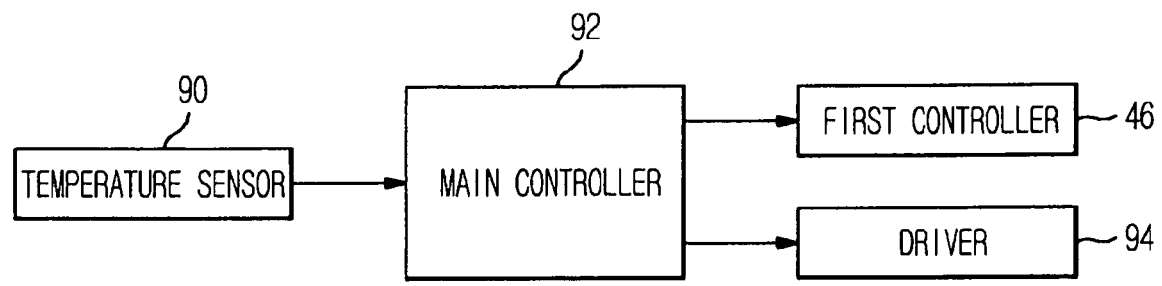
FIG. 3 is a block diagram illustrating a control configuration of the fuel cell system according to an embodiment of the present invention.

FIG. 3 is a block diagram illustrating a control configuration of the fuel cell system according to an embodiment of the present invention. For the control configuration, the fuel cell system includes a temperature sensor 90 and a driver 94, together with the main controller 92.

The temperature sensor 90 detects the reaction temperature of the reformer 31, and inputs a value representing the detected reaction temperature to the main controller 92.

The main controller 92 controls the overall operation of the fuel cell system 10 including the supply of the reformer fuel and the supply of the burner fuel. The main controller 92 determines a set point of the supply amount of reformer fuel for a stable S/C control and a set point of the supply amount of burner fuel for a stable lamda control. The main controller 92 then determines a set point of the fuel supply amount of the fuel pump 41 in accordance with the determined set point of the reformer fuel supply amount and the determined set point of the burner fuel supply amount. The determined set point of the fuel supply amount of the fuel pump 41 is sent from the main controller 92 to the first controller 46. The first controller 46 compares the set point of the fuel supply amount of the fuel pump 41 with the actual fuel supply amount of the fuel pump 41 detected by the first flow meter 42, and adjusts the power of the fuel pump 41 in accordance with the result of the comparison.

The main controller 92 may be configured to control the set point of the fuel supply amount of the fuel pump 41 such that the fuel supply amount of the fuel pump 41 is greater than the sum of the supply amount of reformer fuel and the supply amount of burner fuel. In this case, a certain amount of fuel 60 remains because the reformer fuel and burner fuel are supplied in amounts corresponding to the set points thereof to the first and second valves 43 and 44, respectively. Due to the remaining fuel amount, the internal pressure of the fuel supply line increases. As a result, it is possible to reduce the supply pulsation of the fuel 60 occurring due to the fuel pump 41.

The main controller 92 also compares the sum of the set points of the reformer and burner fuel supply amounts with a predetermined minimum value. If the sum of the set points of the reformer and burner fuel supply amounts is less than the predetermined minimum value, the main controller 92 determines that the current supply amount of the fuel 60 corresponds to a fuel supply amount enabling the fuel 60 to be sufficiently supplied by the pressure of the fuel 60 itself, without operation of the fuel pump 41. In this case, accordingly, the main controller 92 adjusts the power of the fuel pump 41, or stops the fuel pump 41. In this case, the main controller 92 also continuously monitors whether the actual reformer and burner fuel supply amounts detected by the first and second flow meters 42 and 45 supply the set points of the reformer and burner fuel supply amounts, respectively, to re-start the fuel pump 41 or to re-adjust the power of the fuel pump 41, if necessary.

The main controller 92 also adjusts the opening degree of the first valve 43 such that the reformer fuel is supplied to the reformer 31 via the first valve 43 in an amount corresponding to the set point of the reformer fuel supply amount for the S/C control. For this function, the main controller 92 derives a difference between the actual fuel supply amount of the fuel pump 41 detected by the first flow meter 42 and the actual burner fuel supply amount detected by the second flow meter 45, to determine whether the reformer fuel is supplied in an amount corresponding to the set point of the reformer fuel supply amount. In accordance with the result of the determination, the main controller 92 controls the opening degree of the first valve 43, using a proportional-integral (PI) control system.

In addition, the main controller 92 compares a set point of the temperature of the reformer 31 determined, for the lamda control, in accordance with a load, with the actual temperature of the reformer 31 detected by the temperature sensor 90. In accordance with the result of the comparison, the main controller 92 determines the set point of the burner fuel supply amount. Thereafter, the main controller 92 compares the determined set point of the burner fuel supply amount with the actual burner fuel supply amount detected by the second flow meter 45. In accordance with the result of the comparison, the main controller 92 controls the opening degree of the second valve 44, using the PI control system, such that the burner fuel is supplied to the burner 32 via the second valve 44 in an amount corresponding to the determined set point of the burner fuel supply amount.

The driver 94 operates the fuel pump 41, first valve 43, and second valve 44 in accordance with drive control signals from the main controller 92.

Figure 4:
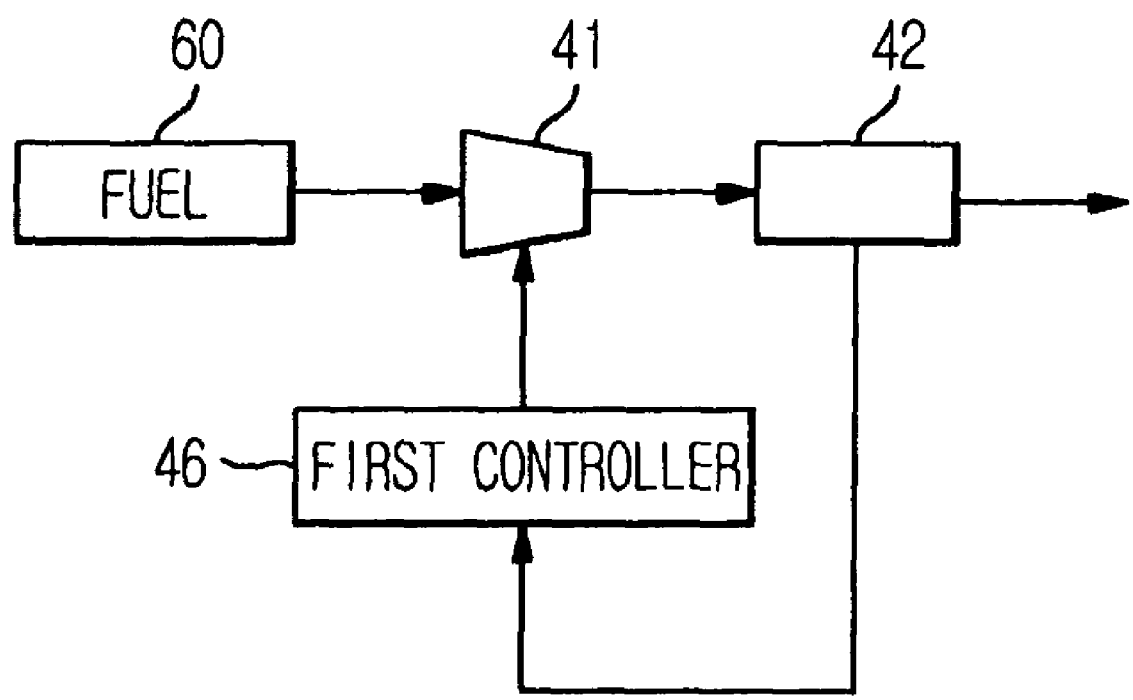
FIG. 4 is a block diagram illustrating a part of a fuel supplying unit according to an embodiment of the present invention.

FIG. 4 is a block diagram illustrating a part of the fuel supplying unit according to an embodiment of the present invention.

Referring to FIG. 4, the first controller 46 is a PCB having a hardware configuration integrated with the fuel pump 41. The first controller 46 receives the set point of the fuel supply amount of the fuel pump 41 from the main controller 92, compares the received set point with the actual fuel supply amount of the fuel pump 41 detected by the first flow meter 42, and adjusts the power of the fuel pump 41 in accordance with the result of the comparison.

Hereinafter, the fuel cell system having the above-described configuration, operations of a fuel supply method thereof, and functions and effects thereof will be described.

Figure 5:
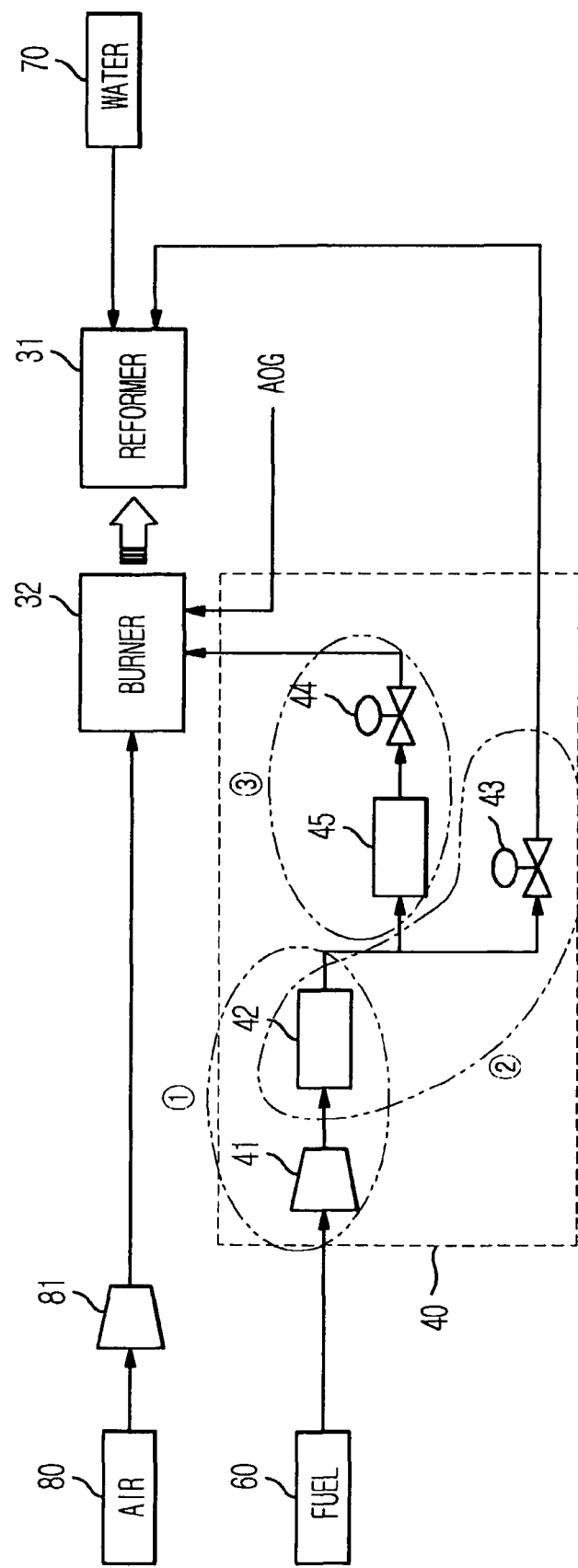
FIG. 5 is a block diagram illustrating a main part of the fuel cell system according to an embodiment of the present invention.

FIG. 5 is a block diagram illustrating a main part of the fuel cell system according to an embodiment of the present invention. FIG. 5 illustrates a configuration of the fuel supplying unit 40 enabling the fuel cell system 10 to operate efficiently and stably against pressure loss and pulsation.

Referring to FIG. 5, the fuel 60 is supplied, as reformer fuel, to the reformer 31 via the fuel pump 41 and first valve 43, together with water 70. The fuel 60 is also supplied, as burner fuel, to the burner 32 via the fuel pump 41 and second valve 44. Air 80 is also supplied to the burner 32 via the air supply pump 81.

Now, the control method to supply the fuel 60, as reformer fuel and burner fuel, to the reformer 31 and burner 32, using the configuration of the fuel supplying unit 40 shown in FIG. 5 will be described with reference to FIGS. 6 to 9.

Figure 6:
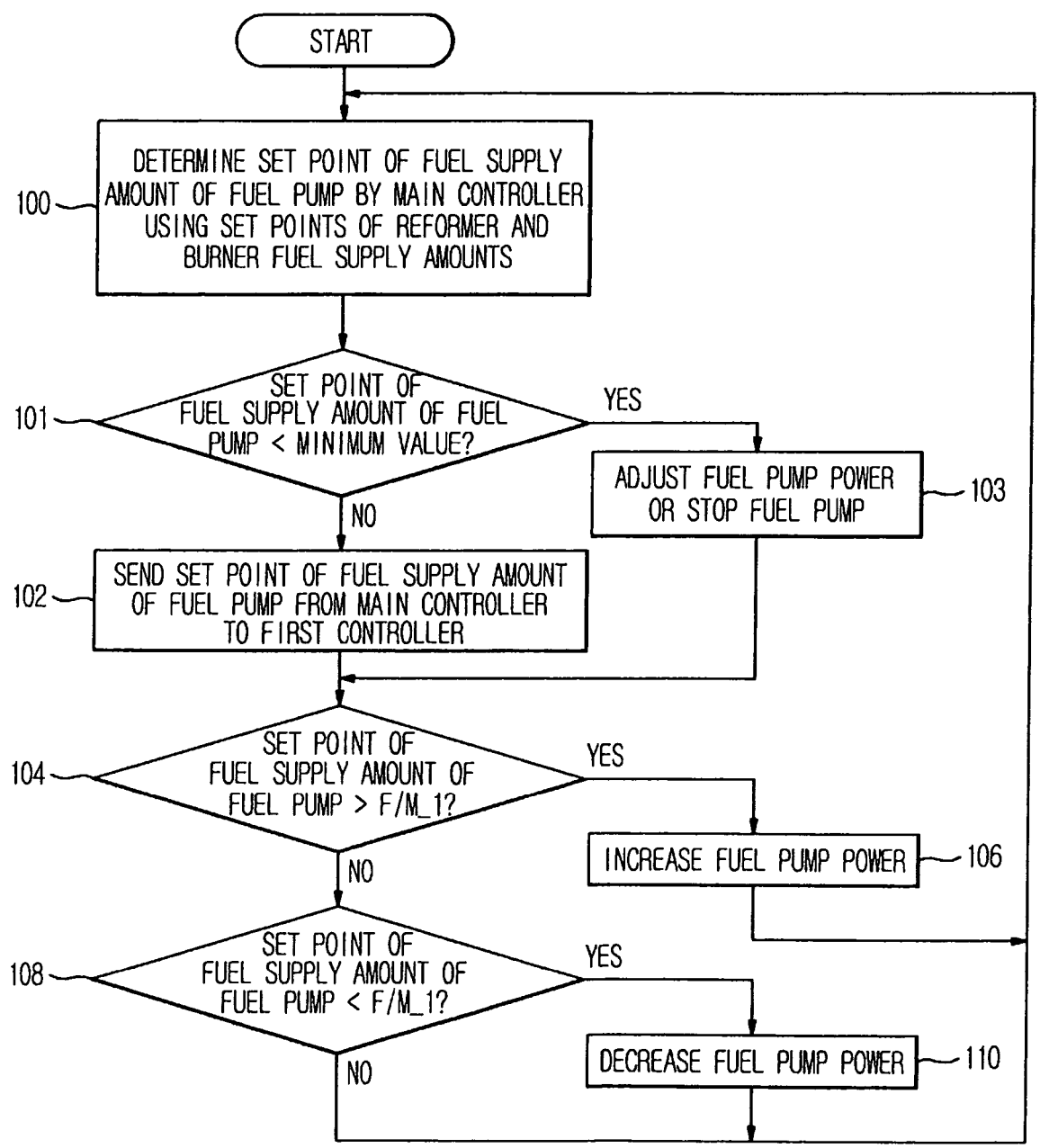
FIG. 6 is a flow chart illustrating a method to control the total fuel supply amount of the fuel cell system in accordance with an embodiment of the present invention.

FIG. 6 is a flow chart illustrating a method to control the total fuel supply amount of the fuel cell system in accordance with an embodiment of the present invention. The illustrated method controls the supply of the fuel 60, using a fuel supply line (fuel pump and first flow meter) designated by "①" in FIG. 5.

Referring to FIG. 6, the main controller 92 determines a set point of the supply amount of reformer fuel for a stable S/C control of the fuel cell system 10 and a set point of the supply amount of burner fuel for a stable lamda control of the fuel cell system 10 (100). The main controller 92 then determines a set point of the fuel supply amount of the fuel pump 41 in accordance with the determined set point of the reformer fuel supply amount and the determined set point of the burner fuel supply amount (100).

Thereafter, the main controller 92 determines whether the determined set point of the fuel supply amount of the fuel pump 41 is less than a predetermined minimum value (a fuel supply amount enabling the fuel 60 to be sufficiently supplied by the pressure of the fuel 60 itself) (101). When the set point of the fuel supply amount of the fuel pump 41 is less than the predetermined minimum value, the main controller 92 determines that the current supply amount of the fuel 60 corresponds to a fuel supply amount enabling the fuel 60 to be sufficiently supplied by the pressure of the fuel 60 itself, without operation of the fuel pump 41. In this case, accordingly, the main controller 92 adjusts the power of the fuel pump 41, or stops the fuel pump 41 (103). In this case, the main controller 92 also continuously monitors whether the actual reformer and burner fuel supply amounts detected by the first and second flow meters 42 and 45 supply the set points of the reformer and burner fuel supply amounts, respectively, to re-start the fuel pump 41 or to re-adjust the power of the fuel pump 41, if necessary.

When it is determined at operation 101 that the set point of the fuel supply amount of the fuel pump 41 is not less than the predetermined minimum value, the main controller 92 determines that the current supply amount of the fuel 60 corresponds to a fuel supply amount preventing the fuel 60 from being supplied without operation of the fuel pump 41 (102). In this case, the main controller 92 sends the determined set point of the fuel supply amount of the fuel pump 41 to the first controller 46 (102).

The first controller 46 compares the set point of the fuel supply amount of the fuel pump 41 received from the main controller 92 with an actual fuel supply amount of the fuel pump 41, F/M_1, detected by the first flow meter 42. When the received set point of the fuel supply amount of the fuel pump 41 is greater than the detected actual fuel supply amount of the fuel pump 41, F/M_1 (104), the first controller 46 increases the power of the fuel pump 41, to enable the fuel 60 to be supplied to the reformer 31 and burner 32 in amounts corresponding to the set points of reformer and burner fuel supply amounts, respectively (106).

On the other hand, when the received set point of the fuel supply amount of the fuel pump 41 is less than the detected actual fuel supply amount of the fuel pump 41, F/M_1 (108), the first controller 46 decreases the power of the fuel pump 41, to enable the fuel 60 to be supplied to the reformer 31 and burner 32 in amounts corresponding to the set points of reformer and burner fuel supply amounts, respectively (110).

Meanwhile, when the received set point of the fuel supply amount of the fuel pump 41 is equal to the detected actual fuel supply amount of the fuel pump 41, F/M_1, the first controller 46 feeds back to operation 100, to receive an actual fuel supply amount of the fuel pump 41, F/M_1, newly detected by the first flow meter 42, and to compare the received actual fuel supply amount with the received set point of the fuel supply amount of the fuel pump 41. In accordance with the result of the comparison, the first controller 46 executes the associated operations following operation 100.

In accordance with the fuel supply method of the present invention shown in FIG. 6, the influence of the fuel pressure on the operation of the fuel cell system 10 is reduced. Accordingly, the influence of the environment of the fuel supply source on the operation of the fuel cell system 10 is reduced.

Figure 7:
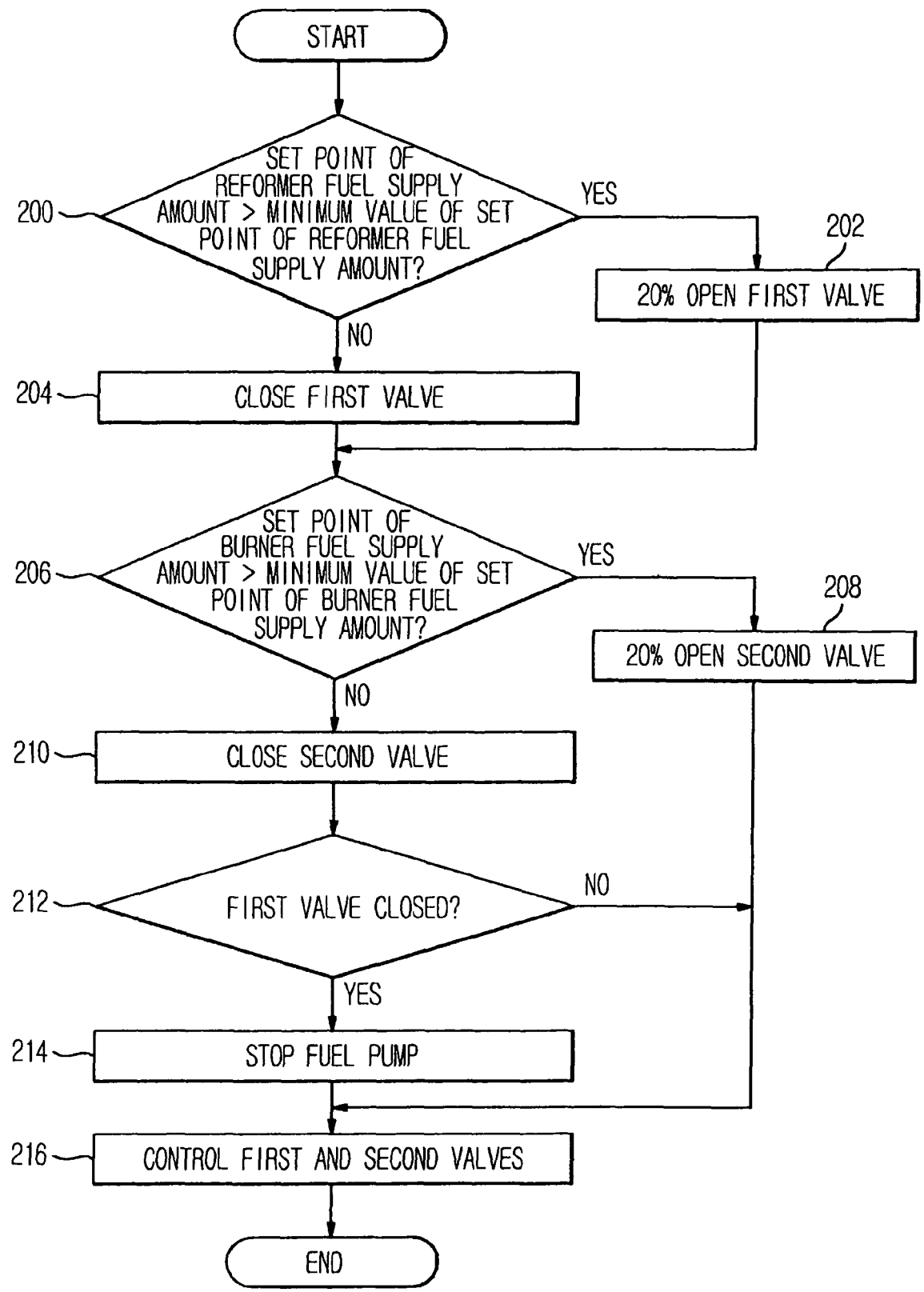
FIG. 7 is a flow chart illustrating a method to supply fuel to a burner and a reformer via a plurality of valves in the fuel cell system in accordance with an embodiment of the present invention.

FIG. 7 is a flow chart illustrating a method to supply fuel to the burner and reformer via a plurality of valves in the fuel cell system in accordance with an embodiment of the present invention. In accordance with this method, the main controller 92 determines the set points of the reformer and burner fuel supply amounts through an S/C control and a lamda control, respectively, to adjust the opening degrees of the first and second valves 43 and 44.

Referring to FIG. 7, the main controller 92 compares the set point of the reformer fuel supply amount determined through the S/C control with a predetermined minimum value of the set point of the reformer fuel supply amount (200). When the determined set point of the reformer fuel supply amount is greater than the predetermined minimum value of the set point of the reformer fuel supply amount, the main controller 92 adjusts the opening degree of the first valve 43 to be 20% (202), such that the fuel 60 is supplied in real time. Thereafter, the main controller 92 controls the first valve 43 such that the actual fuel supply amount of the reformer 31 determined through the first and second flow meters 42 and 45 is the determined set point (target value), while comparing the actual fuel supply amount of the reformer 31 with the determined set point (202). The opening degree of 20% is an opening degree of the first valve 43 set when the first valve 43 is initially opened. The first valve 43 may be initially opened at, for example, an opening degree of 10%.

When it is determined at operation 200 that the determined set point of the reformer fuel supply amount is not greater than the predetermined minimum value of the set point of the reformer fuel supply amount, the main controller 92 closes the first valve 43 because it is unnecessary to supply the fuel to the reformer 31 (204).

Subsequently, the main controller 92 compares the set point of the burner fuel supply amount determined through the lamda control with the predetermined minimum value of the set point of the burner fuel supply amount (206). When the determined set point of the burner fuel supply amount is greater than the predetermined minimum value of the set point of the burner fuel supply amount, the main controller 92 adjusts the opening degree of the second valve 44 to be 20% (208).

On the other hand, when it is determined at operation 206 that the determined set point of the burner fuel supply amount is not greater than the predetermined minimum value of the set point of the burner fuel supply amount, the main controller 92 closes the second valve 44 because it is unnecessary to supply the fuel to the burner 32 (210). If the first valve 43 is also in a closed state in this case (212), the main controller 92 stops the fuel pump 41 because it is unnecessary to supply the reformer fuel and burner fuel (214).

Thereafter, the main controller 92 returns to a loop to precisely control the flow rates of the first and second valves 43 and 44 (216).

In accordance with the fuel supply method of the present invention shown in FIG. 7, it is possible to enhance the durability and efficiency of the fuel cell system 10 because the supply of the fuel 60 can be more efficiently and precisely achieved during the start-up and operation of the stack 20.

Figure 8:
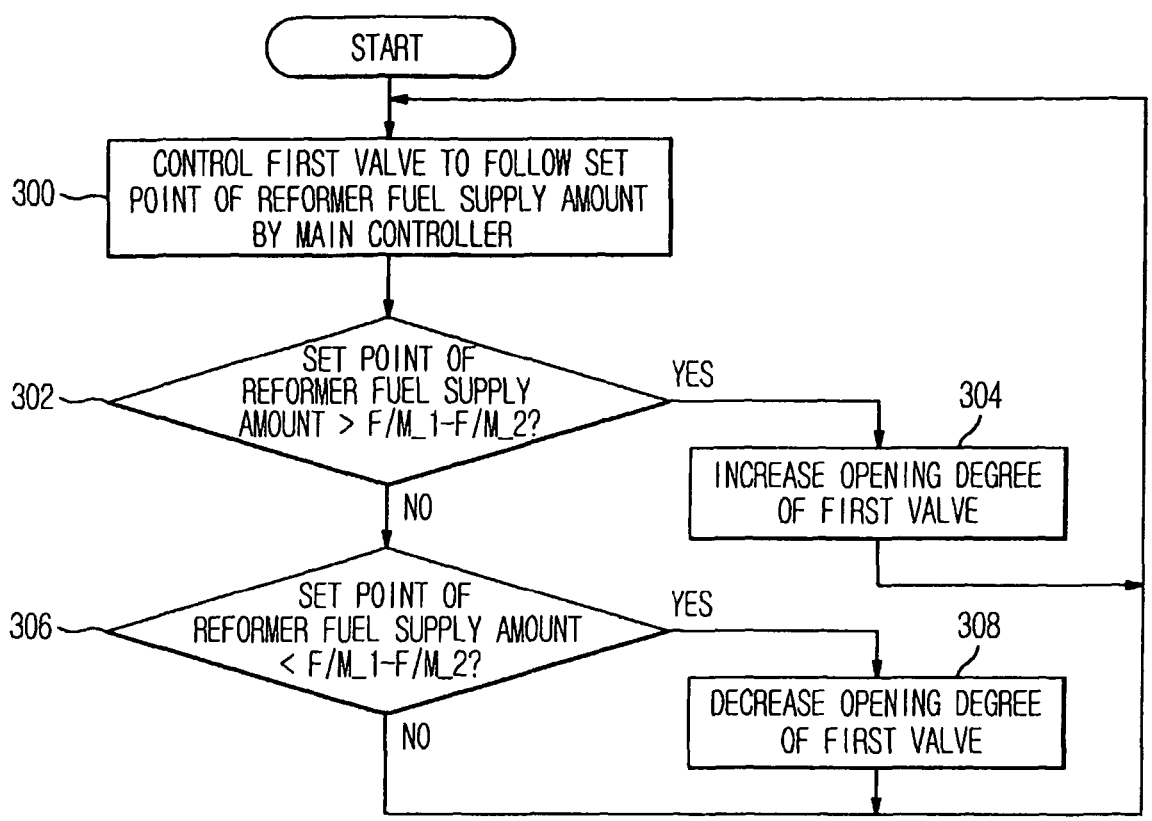
FIG. 8 is a flow chart illustrating an operation to control the opening degree of a first valve in the fuel cell system in accordance with an embodiment of the present invention.

FIG. 8 is a flow chart illustrating an operation to control the opening degree of the first valve in the fuel cell system in accordance with an embodiment of the present invention. The illustrated method controls the supply of the fuel 60, using a reformer fuel supply line (first valve and first flow meter) designated by "②" in FIG. 5, and the second flow meter 45 which is arranged in a burner fuel supply line.

Referring to FIG. 8, the main controller 92 controls the opening degree of the first valve 43 to supply the set point of the reformer fuel supply amount for a stable S/C control (300). The main controller 92 derives a difference between the actual fuel supply amount of the fuel pump detected by the first flow meter 42 and the actual burner fuel supply amount detected by the second flow meter 45, namely, a difference "F/M_1–F/M_2". Thereafter, the main controller 92 compares the derived difference "F/M_1–F/M_2" with the set point of the reformer fuel supply amount (302).

When it is determined at operation 302 that the set point of the reformer fuel supply amount is greater than the difference "F/M_1–F/M_2" between the values detected by the first and second flow meters 42 and 45, the main controller 92 executes a PI control to increase the opening degree of the first valve 43, and thus, to increase the supply amount of the reformer fuel 60 (304).

On the other hand, when it is determined at operation 302 that the set point of the reformer fuel supply amount is less than the difference "F/M_1–F/M_2" between the values detected by the first and second flow meters 42 and 45 (306), the main controller 92 executes a PI control to decrease the opening degree of the first valve 43, and thus, to decrease the supply amount of the reformer fuel 60 (308).

When it is determined at operation 306 that the set point of the reformer fuel supply amount is equal to the difference "F/M_1–F/M_2" between the values detected by the first and second flow meters 42 and 45, the main controller 92 is fed back to operation 300 while maintaining the opening degree of the first valve 43, and then executes operation 300 and subsequent operations.

In accordance with the fuel supply method of the present invention illustrated in FIG. 8, the fuel 60 is constantly supplied in response to a variation in pressure occurring in the fuel cell system 10.

Figure 9:
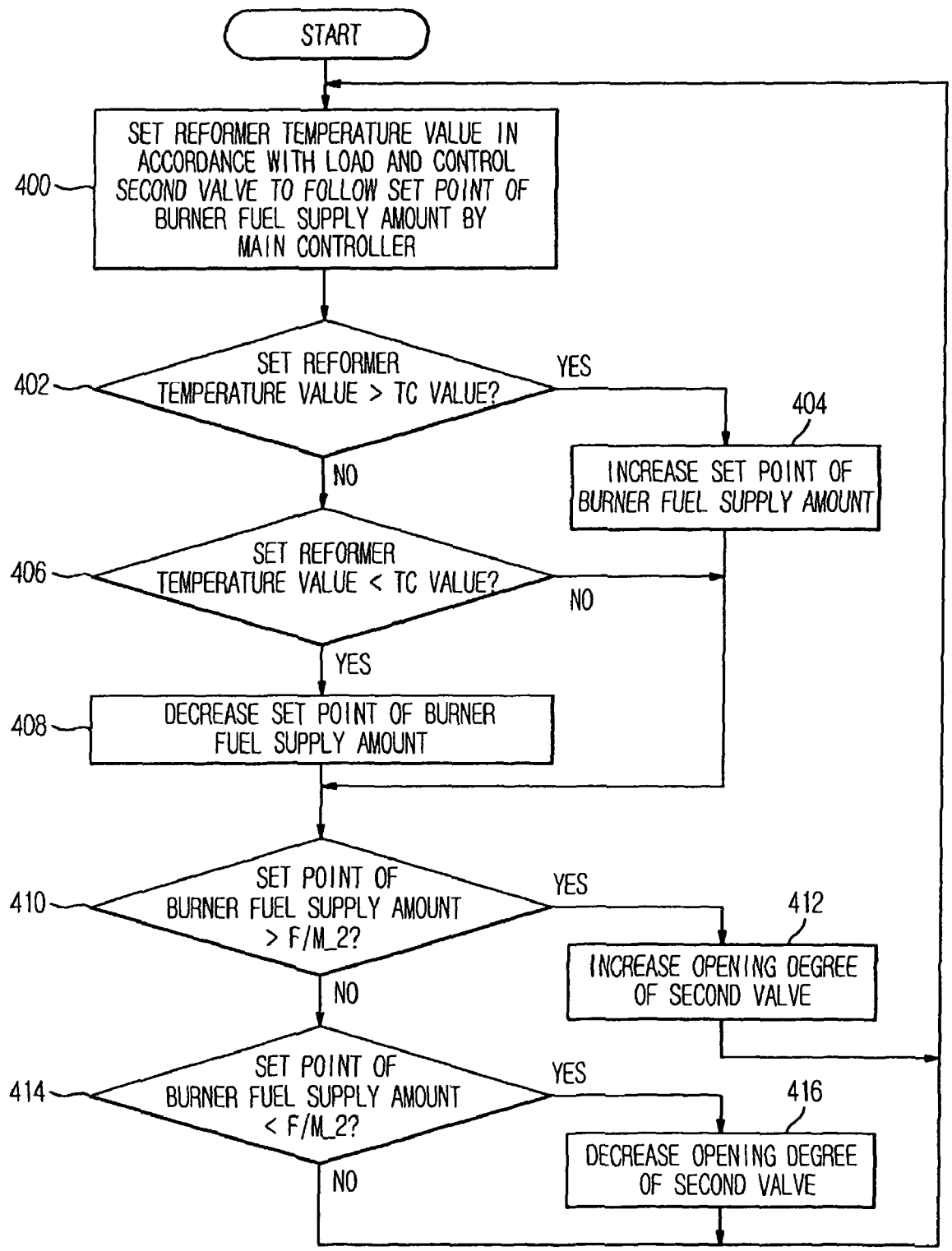
FIG. 9 is a flow chart illustrating an operation to control the opening degree of a second valve in the fuel cell system in accordance with an embodiment of the present invention.

FIG. 9 is a flow chart illustrating an operation to control the opening degree of the second valve in the fuel cell system in accordance with an embodiment of the present invention. The illustrated method controls the supply of the fuel 60, using a reformer fuel supply line (second valve and second flow meter) designated by "③" in FIG. 5.

Referring to FIG. 9, the main controller 92 sets a reformer temperature value in accordance with a load, to achieve a stable lamda control, and determines a set point of a burner fuel supply amount required in accordance with the set reformer temperature. The main controller 92 then sends the determined set point to the second valve 44 (400).

Thereafter, the main controller 92 compares the reformer temperature value set in accordance with the load, with the reformer temperature value (TC value) detected by the temperature sensor 90 (402). When the set reformer temperature value is more than the reformer temperature value (TC value), the main controller 92 increases the set point of the burner fuel supply amount, to increase the supply amount of the burner fuel (404).

When it is determined at operation 402 that the set reformer temperature value is not more than the reformer temperature value (TC value), the main controller 92 determines whether the set reformer temperature value is less than the reformer temperature value (TC value) (406). When the set reformer temperature value is not less than the reformer temperature value (TC value), the main controller 92 proceeds to operation 410, and executes operation 410 and subsequent operation.

On the other hand, when it is determined at operation 406 that the set reformer temperature value is less than the reformer temperature value (TC value), the main controller decreases the set point of the burner fuel supply amount, to correspondingly control the supply of the burner fuel (408).

Thereafter, the main controller 92 compares the determined set point of the burner fuel supply amount with the actual burner fuel supply amount F/M_2 detected by the second flow meter 45 (410). When the determined set point of the burner fuel supply amount is more than the actual burner fuel supply amount F/M_2, the main controller 92 executes a PI control to increase the opening degree of the second valve 44, to precisely control the supply of the burner fuel (412).

When it is determined at operation 410 that the determined set point of the burner fuel supply amount is not greater than the actual burner fuel supply amount F/M_2, the main controller 92 determines whether the determined set point of the burner fuel supply amount is less than the actual burner fuel supply amount F/M_2 (414). When the determined set point of the burner fuel supply amount is not less than the actual burner fuel supply amount F/M_2, the main controller 92 is fed back to operation 400, and executes operation 400 and subsequent operations.

On the other hand, when it is determined at operation 414 that the determined set point of the burner fuel supply amount is less than the actual burner fuel supply amount F/M_2, the main controller 92 executes a PI control to decrease the opening degree of the second valve 44, to precisely control the supply of the burner fuel (416).

In accordance with the fuel supply method of the present invention illustrated in FIG. 9, it is possible to constantly supply the fuel 60 in response to a variation in pressure occurring in the fuel cell system 10.

Figure 10:
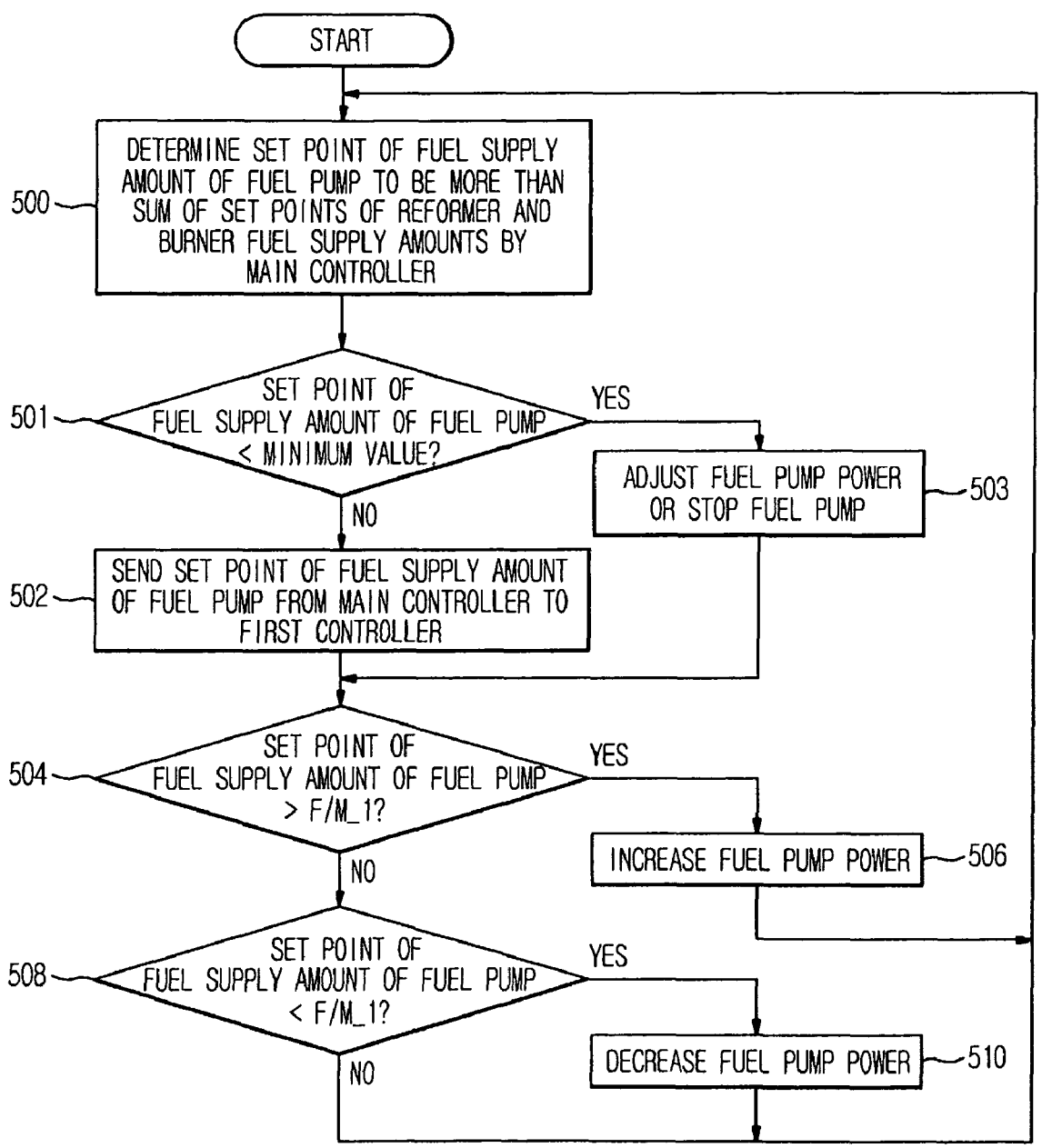
FIG. 10 is a flow chart illustrating a method to control the total fuel supply amount in the fuel cell system in accordance with another embodiment of the present invention.

FIG. 10 is a flow chart illustrating a method to control the total fuel supply amount in the fuel cell system in accordance with another embodiment of the present invention. The illustrated method controls the supply of the fuel 60, using the fuel supply line (fuel pump and first flow meter) designated by "①" in FIG. 5.

Referring to FIG. 10, the main controller 92 determines a set point of the supply amount of reformer fuel for a stable S/C control of the fuel cell system 10 and a set point of the supply amount of burner fuel for a stable lamda control of the fuel cell system 10 (500). The main controller 92 then determines a set point of the fuel supply amount of the fuel pump 41 such that the set point of the fuel supply amount of the fuel pump 41 is greater than the sum of the determined set point of the reformer fuel supply amount and the determined set point of the burner fuel supply amount to control the fuel supply amount of the fuel pump 41 to be greater than the sum of the reformer and burner fuel supply amounts (500).

Thereafter, the main controller 92 determines whether the determined set point of the fuel supply amount of the fuel pump 41 is less than a predetermined minimum value (a fuel supply amount enabling the fuel 60 to be sufficiently supplied by the pressure of the fuel 60 itself (501). When the set point of the fuel supply amount of the fuel pump 41 is less than the predetermined minimum value, the main controller 92 determines that the current supply amount of the fuel 60 corresponds to a fuel supply amount enabling the fuel 60 to be sufficiently supplied by the pressure of the fuel 60 itself, without operation of the fuel pump 41. In this case, accordingly, the main controller 92 adjusts the power of the fuel pump 41, or stops the fuel pump 41 (503). In this case, the main controller 92 also continuously monitors whether the actual reformer and burner fuel supply amounts detected by the first and second flow meters 42 and 45 supply the set points of the reformer and burner fuel supply amounts, respectively, to re-start the fuel pump 41 or to re-adjust the power of the fuel pump 41, if necessary.

When it is determined at operation 501 that the set point of the fuel supply amount of the fuel pump 41 is not less than the predetermined minimum value, the main controller 92 determines that the current supply amount of the fuel 60 corresponds to a fuel supply amount preventing the fuel 60 from being supplied without operation of the fuel pump 41 (102). In this case, the main controller 92 sends the determined set point of the fuel supply amount of the fuel pump 41 to the first controller 46 (502).

The first controller 46 compares the set point of the fuel supply amount of the fuel pump 41 received from the main controller 92 with an actual fuel supply amount of the fuel pump 41, F/M_1, detected by the first flow meter 42. When the received set point of the fuel supply amount of the fuel pump 41 is greater than the detected actual fuel supply amount of the fuel pump 41, F/M_1 (504), the first controller 46 increases the power of the fuel pump 41, to enable the fuel 60 to be supplied to the reformer 31 and burner 32 in amounts corresponding to the set points of reformer and burner fuel supply amounts, respectively (506).

On the other hand, when the received set point of the fuel supply amount of the fuel pump 41 is less than the detected actual fuel supply amount of the fuel pump 41, F/M_1 (508), the first controller 46 decreases the power of the fuel pump 41, to enable the fuel 60 to be supplied to the reformer 31 and burner 32 in amounts corresponding to the set points of reformer and burner fuel supply amounts, respectively (510).

Meanwhile, when the received set point of the fuel supply amount of the fuel pump 41 is equal to the detected actual fuel supply amount of the fuel pump 41, F/M_1, the first controller 46 feeds back to operation 500, to receive an actual fuel supply amount of the fuel pump 41, F/M_1, newly detected by the first flow meter 42, and to compare the received actual fuel supply amount with the received set point of the fuel supply amount of the fuel pump 41. In accordance with the result of the comparison, the first controller 46 executes the associated operations following operation 500.

In accordance with the fuel supply method of the present invention shown in FIG. 10, a certain amount of fuel 60 remains when the reformer fuel and burner fuel are supplied in amounts corresponding to the set points thereof to the first and second valves 43 and 44, respectively. Due to the remaining fuel amount, the internal pressure of the fuel supply line increases. As a result, it is possible to reduce the supply pulsation of the fuel 60 occurring due to the fuel pump 41.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A fuel cell system comprising:
   a fuel treating unit to modify fuel to produce modified gas;
   a stack to receive the modified gas from the fuel treating unit to generate energy;
   a fuel supplying unit to supply the fuel to the fuel treating unit, the fuel supplying unit comprising a fuel pump to supply the fuel to the fuel treating unit and a flow meter to detect an actual fuel supply amount of the fuel pump; and
   a controller to determine a fuel supply amount required for a real-time operation of the fuel treating unit based on the detected fuel supply amount of the fuel pump, and to control the fuel supplying unit to supply the determined fuel supply amount.

2. The fuel cell system according to claim 1, wherein:
   the fuel treating unit comprises a reformer to modify the fuel, and a burner to heat the reformer; and
   the fuel supplying unit comprises a first fuel supplier to control a total supply amount of the fuel supplied to the fuel treating unit, and a second fuel supplier to control fuel supply amounts respectively supplied to the reformer and the burner.

3. The fuel cell system according to claim 2, wherein the first fuel supplier comprises a fuel pump to supply the fuel to the fuel treating unit, and the fuel pump supplies a fuel amount equal to a sum of the fuel supply amount supplied to the reformer as a supply amount of reformer fuel and the fuel supply amount supplied to the burner as a supply amount of burner fuel.

4. The fuel cell system according to claim 3, wherein the first fuel supplier controls the total supply amount of the fuel, wherein the fuel pump supplies the fuel in an amount greater than the sum of the reformer and burner fuel supply amounts, to cause the fuel to be pressurized.

5. The fuel cell system according to claim 3, wherein the second fuel supplier comprises a valve to supply the reformer fuel to the reformer, and the valve controls the flow of reformer fuel to supply the reformer fuel supply amount required for the reformer.

6. The fuel cell system according to claim 3, wherein the second fuel supplier comprises a valve to supply the burner fuel to the burner, and the valve controls the flow of the burner fuel to supply the burner fuel supply amount required for the burner.

7. A fuel cell system comprising:
a fuel treating unit to modify fuel to produce hydrogen;
a stack to generate energy through an electrochemical reaction of the hydrogen with oxygen;
a fuel supplying unit to supply the fuel to the fuel treating unit, the fuel supplying unit comprising a fuel pump to supply the fuel to the fuel treating unit and a flow meter to detect an actual fuel supply amount of the fuel pump; and
a main controller to control the fuel supplying unit, wherein the fuel supplying unit supplies a supply amount of reformer fuel required in real time for a reformer to perform the modification based on the detected fuel supply amount of the fuel pump, and a supply amount of burner fuel required in real time for a burner to heat the reformer.

8. The fuel cell system according to claim 7, wherein the fuel supplying unit comprises a first fuel supplier to control a total supply amount of the fuel supplied to the reformer and the burner, and a second fuel supplier to control supply amounts of the fuel respectively supplied to the reformer and the burner.

9. The fuel cell system according to claim 8, wherein:
the first fuel supplier comprises a fuel pump to supply the total supply amount of the fuel supplied to the reformer and the burner, and a first flow meter to detect the total fuel amount; and
the fuel pump supplies a fuel amount equal to a sum of the supply amount of the fuel respectively supplied to the reformer and the burner as reformer fuel and burner fuel.

10. The fuel cell system according to claim 8, wherein:
the first fuel supplier comprises a fuel pump to supply the total supply amount of the fuel supplied to the reformer and the burner, and a first flow meter to detect the total fuel amount; and
the fuel pump supplies a fuel amount greater than a sum of the supply amounts of the fuel respectively supplied to the reformer and the burner as reformer fuel and burner fuel.

11. The fuel cell system according to claim 9, wherein the first fuel supplier further comprises a first controller to determine an operation of the fuel pump based on an external supply pressure of the fuel.

12. The fuel cell system according to claim 11, wherein the main controller determines the fuel supply amount of the fuel pump based on a set point of the reformer fuel supply amount and a set point of the burner fuel supply amount, compares the determined fuel supply amount of the fuel pump with a fuel supply amount of the fuel pump detected by the first flow meter, and adjusts a power of the fuel pump based on a result of the comparison.

13. The fuel cell system according to claim 11, wherein the fuel pump is stopped when a sum of a set point of the reformer fuel supply amount and a set point of the burner fuel supply amount is less than a predetermined minimum supply amount value.

14. The fuel cell system according to claim 9, wherein the second fuel supplier comprises a reformer fuel supply line to control the supply amount of the reformer fuel supplied to the reformer, and a burner fuel supply line to control the supply amount of the burner fuel supplied to the burner.

15. The fuel cell system according to claim 14, wherein:
the reformer fuel supply line comprises a first valve to adjust a supply ratio of the reformer fuel supplied to the reformer; and
the burner fuel supply line comprises a second valve to adjust a supply ratio of the burner fuel supplied to the burner, and a second flow meter to detect a flow rate of fuel passing through the second valve.

16. The fuel cell system according to claim 15, wherein the first and second valves are proportional valves connected to the fuel pump, to precisely control a flow rate of the reformer fuel and a flow rate of the burner fuel, respectively.

17. The fuel cell system according to claim 15, wherein the first valve is adjusted in opening degree based on a comparison of the reformer fuel supply amount determined by the main controller using a difference between values detected by the first and second flow meters.

18. The fuel cell system according to claim 15, wherein the second valve is adjusted in opening degree based on a difference determined by a comparison of the burner fuel supply amount determined by the main controller with a and a value detected by the second flow meter.

19. The fuel cell system according to claim 15, wherein the main controller controls the first valve to be closed when the set point of the reformer fuel supply amount is not greater than a predetermined minimum value.

20. The fuel cell system according to claim 15, wherein the main controller controls the second valve to be closed when the set point of the burner fuel supply amount is not greater than a predetermined minimum value.

21. The fuel cell system according to claim 15, wherein the main controller controls the first valve to be closed when the set point of the reformer fuel supply amount is not greater than a predetermined minimum value for the reformer fuel supply amount, controls the second valve to be closed when the set point of the burner fuel supply amount is not greater than a predetermined minimum value for the burner fuel supply amount, and controls the fuel pump to be stopped when the first and second valves are closed.

22. A fuel supply method of a fuel cell system to generate energy through an electrochemical reaction of hydrogen produced through modification of fuel with oxygen, comprising:
determining an actual supply amount of reformer fuel supplied to a reformer to perform the modification;
determining a supply amount of burner fuel supplied to a burner to heat the reformer;
determining a fuel supply amount of a fuel pump based on the determined reformer fuel supply amount and the determined burner fuel supply amount, and controlling an operation of the fuel pump based on the determined fuel supply amount of the fuel pump; and
controlling a flow rate of fuel supplied to the reformer and a flow rate of fuel supplied to the burner, wherein the flow rates supply, in real time, the determined reformer and burner fuel supply amounts.

23. The fuel supply method according to claim 22, wherein the controlling the operation of the fuel pump comprises operating the fuel pump to cause the fuel supply amount of the fuel pump to be equal to a sum of the reformer fuel supply amount and the burner fuel supply amount.

24. The fuel supply method according to claim 22, wherein the controlling the operation of the fuel pump comprises operating the fuel pump to cause the fuel pump to supply the fuel in an amount greater than a sum of the reformer fuel supply amount and the burner fuel supply amount, in a pressurized state, to adjust a total supply amount of the fuel supplied to the reformer and the burner.

25. The fuel supply method according to claim 22, wherein the controlling the operation of the fuel pump comprises stopping the fuel pump when a fuel amount equal to a sum of the reformer fuel supply amount and the burner fuel supply amount is supplied by an external supply pressure of the fuel.

26. The fuel supply method according to claim 22, wherein the controlling, in real time, the flow rate of fuel supplied to the reformer and the flow rate of fuel supplied to the burner comprises:

provi ding a second valve and a flow meter in a burner fuel supply line, and controlling the flow rate of fuel supplied to the burner to supply the determined burner fuel supply amount based on an adjustment of an opening degree of the second valve and a flow rate detection of the flow meter; and providing a first valve in a reformer fuel supply line, and controlling the flow rate of fuel supplied to the reformer to supply the determined reformer fuel supply amount based on an adjustment of an opening degree of the first valve and a detection of a difference between a fuel supply amount detected by the flow meter and an actual fuel supply amount of the fuel pump.

* * * * *